(12) United States Patent
Ito

(10) Patent No.: US 11,181,162 B2
(45) Date of Patent: Nov. 23, 2021

(54) SHOCK ABSORBER

(71) Applicant: KYB MOTORCYCLE SUSPENSION CO., LTD., Gifu (JP)

(72) Inventor: Mikio Ito, Gifu (JP)

(73) Assignee: KYB MOTORCYCLE SUSPENSION CO., LTD., Gifu (JP)

(*) Notice: Subject to any disclaimer, the term of this patent is extended or adjusted under 35 U.S.C. 154(b) by 0 days.

(21) Appl. No.: 16/629,501

(22) PCT Filed: Sep. 5, 2018

(86) PCT No.: PCT/JP2018/032890
§ 371 (c)(1),
(2) Date: Jan. 8, 2020

(87) PCT Pub. No.: WO2019/065132
PCT Pub. Date: Apr. 4, 2019

(65) Prior Publication Data
US 2021/0131518 A1 May 6, 2021

(30) Foreign Application Priority Data
Sep. 26, 2017 (JP) .............................. JP2017-184627

(51) Int. Cl.
*F16F 9/32* (2006.01)
*F16F 9/49* (2006.01)
(Continued)

(52) U.S. Cl.
CPC ............... *F16F 9/49* (2013.01); *F16F 9/096* (2013.01); *F16F 9/362* (2013.01); *F16F 2222/12* (2013.01)

(58) Field of Classification Search
CPC .. F16F 9/0218; F16F 9/096; F16F 9/36; F16F 9/362; F16F 9/49; F16F 2222/12; F16F 9/3214
See application file for complete search history.

(56) References Cited

U.S. PATENT DOCUMENTS 2,819,064 A 1/1958 Peras et al.
3,150,747 A 9/1964 Bliven et al.
(Continued)

FOREIGN PATENT DOCUMENTS

| JP | 2006-052848 A | 2/2006 |
| JP | 2014-181756 A | 9/2014 |
| JP | 2015-152023 A | 8/2015 |

OTHER PUBLICATIONS

Sep. 14, 2021, Japanese Office Action issued for related JP application No. 2017-184627.

*Primary Examiner* — Thomas W Irvin
(74) *Attorney, Agent, or Firm* — Paratus Law Group, PLLC

(57) ABSTRACT

A shock absorber has a rod that is retractably inserted in an axial direction inside the cylinder, a piston that is provided at a tip of the rod and partitions the inside of the cylinder into an extension-side chamber and a compression-side chamber, a rod guide that is provided at an open end of the cylinder and axially supports the rod, a subcylinder that is provided on the rod guide and forms an annular gap between itself and the cylinder, and a subpiston that is provided on an outer periphery of the rod closer to a base end thereof than the piston, that has an outer periphery in sliding contact with an inner periphery of the cylinder, and that is capable of leaving and entering the annular gap.

4 Claims, 3 Drawing Sheets

(51) Int. Cl.
   *F16F 9/096*     (2006.01)
   *F16F 9/36*      (2006.01)

(56) References Cited

U.S. PATENT DOCUMENTS 7,331,570 B2 * 2/2008 Stenquist .............. F16F 9/0218
                                                188/322.15
2006/0033248 A1   2/2006 Stenquist

* cited by examiner

SHOCK ABSORBER

CROSS REFERENCE TO PRIOR APPLICATION

This application is a National Stage Patent Application of PCT International Patent Application No. PCT/JP2018/032890 (filed on Sep. 5, 2018) under 35 U.S.C. § 371, which claims priority to Japanese Patent Application No. 2017-184627 (filed on Sep. 26, 2017), which are all hereby incorporated by reference in their entirety.

TECHNICAL FIELD

The present invention relates to a shock absorber.

BACKGROUND ART

Conventional shock absorbers comprise a cylinder, a rod that is movably inserted in an axial direction inside the cylinder, a rod guide that is provided at an open end of the cylinder and axially supports the rod, a piston that is coupled to a tip of the rod and partitions the inside of the cylinder into two chambers which are an extension-side chamber and a compression-side chamber, a passage provided in the piston and which interconnects the extension-side chamber and the compression-side chamber, and a leaf valve that is laminated on the piston and affords resistance to the flow of a fluid by flexing when the fluid passes through the passage.

Furthermore, this kind of shock absorber is used by being built into a vehicle suspension, for example, and exhibits a damping force and suppresses vehicle vibrations by generating a differential pressure between the two chambers by affording resistance via the leaf valve to the flow of the fluid which is capable of traveling between the two chambers via a passage at the time of extension and compression.

Further, in this kind of shock absorber, a mechanism for preventing the piston from colliding with great force with the rod guide when the shock absorber reaches an extension limit is sometimes provided by mounting a rebound cushion on the outer periphery of the rod, as disclosed in JP2014-181756A, for example.

SUMMARY OF INVENTION

However, in the case of the shock absorber of JP2014-181756A, although shocks when the shock absorber reaches the extension limit can be absorbed by means of the rebound cushion, because the rebound cushion abuts against the rod guide, a knocking sound has been produced. Moreover, there is sometimes a lack of shock absorption when a rebound cushion is employed, and further improvements in the ride comfort of a vehicle are desirable.

It is therefore an object of the present invention to provide a shock absorber capable of preventing the generation of a knocking sound when the shock absorber reaches an extension limit and which exhibits shock absorption superior to that of the prior art when the shock absorber reaches the extension limit.

The shock absorber of the present invention comprises a rod that is retractably inserted in an axial direction inside a cylinder; a piston that is provided at a tip of the rod and partitions the inside of the cylinder into an extension-side chamber and a compression-side chamber; a rod guide that is provided at an open end of the cylinder and axially supports the rod; a subcylinder that is provided on the rod guide and forms an annular gap between itself and the cylinder; and a subpiston that is provided on an outer periphery of the rod closer to a base end thereof than the piston, that has an outer periphery in sliding contact with an inner periphery of the cylinder, and that is capable of leaving and entering the annular gap.

DESCRIPTION OF EMBODIMENTS

Figure 1:
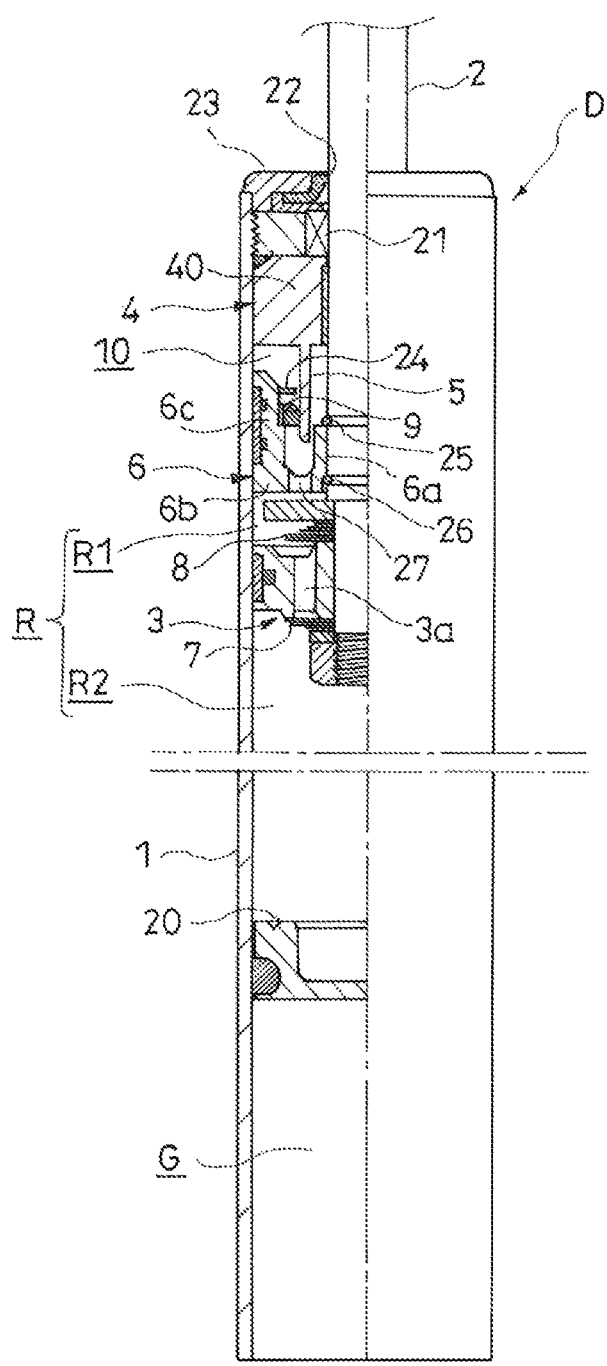
FIG. 1 is a half sectional view from the front illustrating the whole of a shock absorber according to the present embodiment.

The present embodiment will be described hereinbelow with reference to the drawings. Identical reference signs which have been assigned throughout several drawings denote identical or corresponding components.

A shock absorber D is configured comprising a cylinder 1, a rod 2 that is retractably inserted in an axial direction inside the cylinder 1, a piston 3 that is provided at a tip of the rod 2 and partitions the inside of the cylinder 1 into an extension-side chamber R1 and a compression-side chamber R2, a rod guide 4 that is provided at an open end of the cylinder 1 and axially supports the rod 2, a subcylinder 5 that is provided on the rod guide 4 and forms an annular gap 10 between itself and the cylinder 1, and a subpiston 6 that is provided on an outer periphery of the rod 2 closer to a base end thereof, on the opposite side from the piston, than the piston 3, that has an outer periphery in sliding contact with an inner periphery of the cylinder 1, and that is capable of leaving and entering the annular gap.

More precisely, as illustrated in FIG. 1, inside the cylinder 1 of the shock absorber D, a free piston 20, which partitions the inside of the cylinder 1 into a fluid chamber R filled with a fluid such as hydraulic oil and an air chamber G enclosing a gas, is slidably inserted inside the inner periphery of the cylinder 1. The inside of the fluid chamber R is further partitioned into two chambers which are an extension-side chamber R1 and a compression-side chamber R2 by the piston 3 provided at the tip of the rod 2. Note that a fluid other than hydraulic oil such as water or aqueous solution, for example, may also be used as the fluid.

Furthermore, an extension-side passage 3a and a compression-side passage (not illustrated) which interconnect the extension-side chamber R1 and compression-side chamber R2 are formed in the piston 3. In addition, the piston 3 is provided with an extension-side valve 7 that is laminated on the compression-side chamber R2 side of the piston 3 and affords resistance to the flow of fluid passing through the extension-side passage 3a, and a compression-side valve 8 that is laminated on the extension-side chamber R1 side of the piston 3 and affords resistance to the flow of fluid passing through the compression-side passage (not illustrated).

In addition, the air chamber G is configured to be capable of expanding and contracting in response to the movement of the free piston 20 in an axial direction, and of compensating for the variation in volumetric capacity inside the cylinder in an amount corresponding to the volume by which the rod leaves/enters the cylinder under the extending and contracting action of the shock absorber D and of compensating for the variation in fluid volume caused by temperature changes.

Note that, according to the present embodiment, the shock absorber D is of the mono-tube type but may also be configured as a plural-tube type in which an outer tube is provided around the outer periphery of the cylinder 1, and a base valve is installed therebelow in the drawing of cylinder 1. When the shock absorber D is of the plural-tube type, variations in the volumetric capacity inside the cylinder in an amount corresponding to the volume by which the rod leaves/enters the cylinder under the extending and contracting action of the shock absorber D may be compensated for by means of a reservoir formed between the outer tube and the cylinder 1.

In addition, as illustrated in FIG. 1, on the rod guide 4 on the opposite side from the piston are laminated an oil seal 21 that scrapes, into the cylinder 1, fluid that has stuck to the outer periphery of the rod 2 during the extending action of the shock absorber D, and a dust seal 22 that scrapes, out of the cylinder 1, dust that has stuck to the outer periphery of the rod 2 during the contracting action of the shock absorber D. Furthermore, a cap 23 is press-fitted onto the open end of the cylinder 1, and the oil seal 21 and dust seal 22 are thus fixed sandwiched between the rod guide 4 and cap 23.

Figure 2:
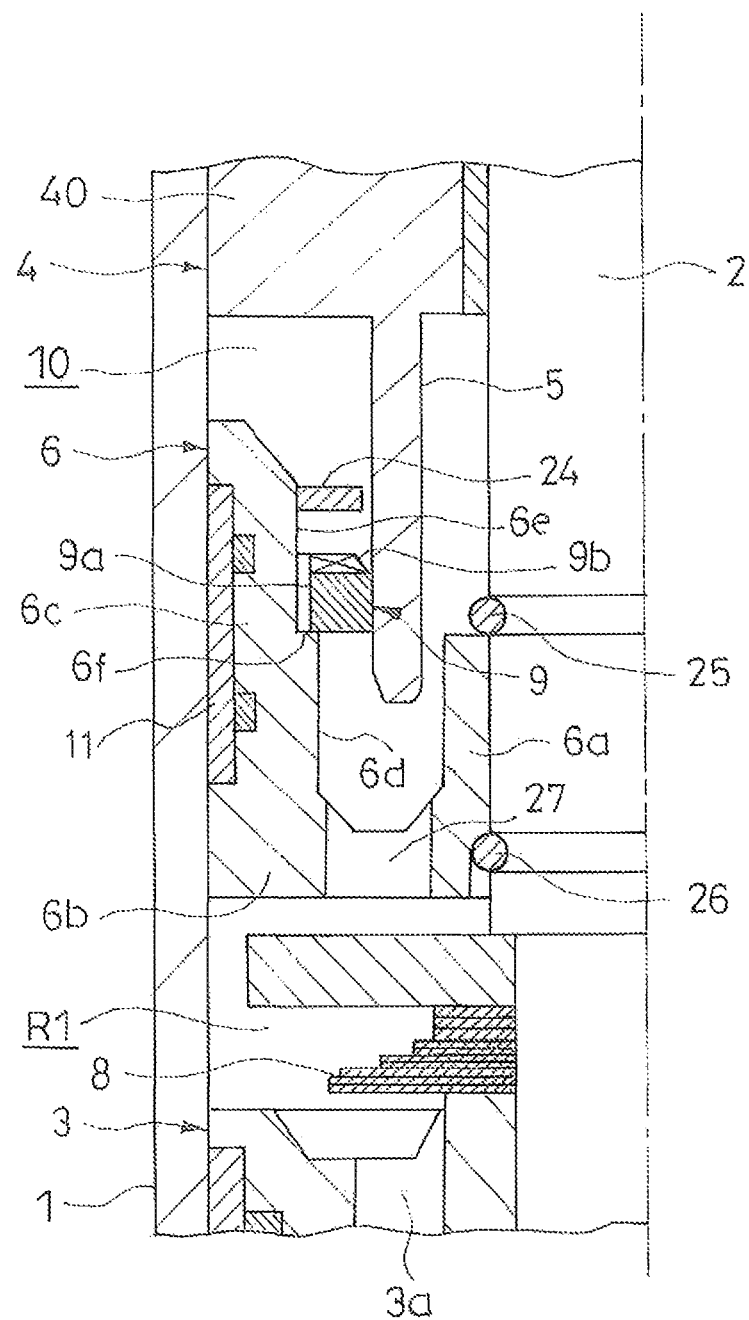
FIG. 2 is a partial enlarged view of FIG. 1.

As illustrated in FIGS. 1 and 2, the rod guide 4 comprises an annular rod guide body 40 that is press-fitted inside the cylinder 1 and axially supports the rod 2, and a subcylinder 5 which is provided on the piston 3 end (lower end in the drawings) of the rod guide body 40, that has a smaller outside diameter than the rod guide body 40, and that forms an annular gap 10 between itself and the cylinder 1.

As illustrated in FIGS. 1 and 2, the subpiston 6 has a tubular attachment portion 6a which is mounted, spaced apart in the axial direction from the piston 3, on the outer periphery of the rod 2 closer to the base end side, which is the opposite side from the piston, than the piston 3, an annular bottom portion 6b that extends in an outer peripheral direction from the lower end of the attachment portion 6a, and a tubular portion 6c that protrudes from an outer peripheral side end portion of the annular bottom portion 6b toward the rod guide 4 and has an outer periphery in sliding contact with the inner periphery of the cylinder 1, wherein an annular oil lock piece 9 is mounted on the inner periphery of the tubular portion 6c. However, the subpiston 6 may have a shape enabling the tubular portion 6c to leave and enter the annular gap 10, there being no particular limitations on the shape other than the tubular portion 6c.

Describing each of the parts of the subpiston 6 in detail, the attachment portion 6a is tubular, and, as illustrated in FIG. 2, is sandwiched between snap rings 25 and 26, which are each mounted in annular grooves (not labelled) formed as a pair in upper and lower positions in an axial direction in the outer periphery of the rod 2. The subpiston 6 is thus held by the outer periphery of the rod 2. However, the means for coupling the subpiston 6 to the rod 2 is not limited to the foregoing means.

In addition, as illustrated in FIG. 2, formed in the annular bottom portion 6b is a communication portion 27 that interconnects the chamber on the rod guide 4 side and the chamber on the piston 3 side of the extension-side chamber R1 partitioned by the subpiston 6, and that is configured to prevent resistance to the flow of fluid passing therethrough. Thus, when the shock absorber D extends and contracts, the subpiston 6 does not obstruct the flow of fluid in the extension-side chamber R1, and does not affect the damping force exerted by the shock absorber D.

In addition, as illustrated in FIG. 2, the tubular portion 6c has a small inside diameter portion 6d formed on the piston 3 side and a large inside diameter portion 6e that is connected to the small inside diameter portion 6d on the opposite side from the piston and has a larger inside diameter than the small inside diameter portion 6d, and a step portion 6f is formed at the boundary between the small inside diameter portion 6d and large inside diameter portion 6e. Further, the oil lock piece 9 is slidably mounted on the inner periphery of the large inside diameter portion 6e. In addition, an annular regulating member 24 is fixed to the large inside diameter portion 6e further on the opposite side from the piston than the oil lock piece 9, and detachment of the oil lock piece 9 is prevented by the step portion 6f and movement of the oil lock piece 9 is regulated by the regulating member 24.

In addition, the inside diameter of the oil lock piece 9 is configured to be substantially the same as the outside diameter of the subcylinder 5, and the inner periphery of the oil lock piece 9 and the outer periphery of the subcylinder 5 are capable of making sliding contact with each other.

Furthermore, as illustrated in FIG. 2, a vertical groove 9a that interconnects the step portion 6f side (downward in the drawing) of the oil lock piece 9 and the regulating member 24 side (upward in the drawing) is formed in the outer peripheral portion of the oil lock piece 9. Further, a notch 9b, which communicates with the vertical groove 9a, is formed at the upper end of the drawing on the regulating member 24 side of the oil lock piece 9.

In addition, an annular groove (not labeled) is formed in the outer periphery of the tubular portion 6c, and a piston ring 11 made of a synthetic resin is mounted in this annular groove. Accordingly, the subpiston 6 is capable of making sliding contact with the inner periphery of the cylinder 1 via the piston ring 11 and of moving smoothly in an axial direction inside the cylinder 1.

Next, the action of the shock absorber D according to the present embodiment will be described. First, when the shock absorber D operates by contracting, fluid in an amount corresponding to the volumetric capacity of the compression moves from the compression-side chamber R2 compressed by the piston 3 to the extension-side chamber R1 via a compression-side passage (not illustrated). Thereupon, a compression-side damping force is generated under the action of resistance exerted by the compression-side valve 8 to the flow of fluid passing through the compression-side passage (not illustrated). Note that the volumetric capacity of the rod 2 entering the cylinder 1 is compensated for by the reduction in the air chamber G as the free piston 20 descends.

Conversely, when the shock absorber D operates by extending, fluid in an amount corresponding to the volumetric capacity of the compression moves from the extension-side chamber R1 compressed by the piston 3 to the compression-side chamber R2 via the extension-side passage 3a. Thereupon, an extension-side damping force is generated under the action of resistance exerted by the extension-side valve 7 to the flow of fluid passing through the extension-side passage 3a. Note that the volumetric capacity of the rod 2 leaving the cylinder 1 is compensated for by the expansion in the air chamber G as the free piston 20 rises.

In addition, when the shock absorber D extends, the tubular portion 6c of the subpiston 6 held by the outer periphery of the rod 2 is inserted into the annular gap 10, and the oil lock piece 9 is brought into sliding contact with the outer periphery of the subcylinder 5. Thus, fluid in an amount corresponding to the volumetric capacity of penetration of the tubular portion 6c and oil lock piece 9 is discharged from the annular gap 10 through the gap between the subcylinder 5 and tubular portion 6c. Then, in pushing against the flow of the discharged fluid, the oil lock piece 9 moves toward the step portion 6f, abuts against the step portion 6f, and the upward and downward communication of the oil lock piece 9 via the vertical groove 9a and notch 9b is blocked, and hence the annular gap 10 is sealed and the pressure rises. Accordingly, when the shock absorber D is fully extended, the annular gap 10 is oil-locked and the shock when the shock absorber D reaches the extension limit can be absorbed.

Further, when the shock absorber D switches from a fully extended state to a contracting action, the oil lock piece 9 moves toward the regulating member 24, the annular gap 10 communicates with the chamber on the piston 3 side via the vertical groove 9a and notch 9b, and the fluid in the extension-side chamber R1 flows to the annular gap 10, and therefore the subpiston 6 smoothly exits the annular gap 10.

Furthermore, as described earlier, the shock absorber D comprises the rod guide 4 that is provided at an open end of the cylinder 1 and axially supports the rod 2, the subcylinder 5 that is provided on the rod guide 4 and forms the annular gap 10 between itself and the cylinder 1, and the subpiston 6 that is provided on the outer periphery of the rod 2 closer to a base end thereof than the piston 3, that has an outer periphery in sliding contact with the inner periphery of the cylinder 1, and that is capable of leaving and entering the annular gap 10.

According to this configuration, because the annular gap 10 functions as an oil lock chamber when the shock absorber D is fully extended, the rod guide 4 and subpiston 6 do not come into contact and the generation of a knocking sound when the shock absorber D reaches the extension limit can be prevented. Furthermore, because the oil lock facilitates the generation of a large force counteracting the extension of the shock absorber D to a larger degree than a conventional rebound cushion, the shock when the shock absorber reaches the extension limit can be more adequately absorbed by the oil lock than by a rebound cushion. Thus, with the shock absorber D according to the present embodiment, vehicle ride comfort is superior to conventional ride comfort.

In addition, in the shock absorber D according to the present embodiment, the annular gap 10 formed on the outside of the subcylinder 5 functions as an oil lock chamber. Here, although forming the oil lock chamber on the inside of the subcylinder 5 is conceivable, the inside of the subcylinder 5 communicates with the chamber on the oil seal 21 side via the sliding gap between the rod guide 4 and rod 2. Hence, when the oil lock chamber is formed on the inside of the subcylinder 5, the pressure inside the oil lock chamber, which is a high pressure when the shock absorber D is fully extended, is transmitted to the oil seal 21, and a load acts on the oil seal 21.

However, in the shock absorber D according to the present embodiment, because the oil lock chamber is formed on the outside of the subcylinder 5, there is no communication between the annular gap 10 and the subcylinder 5 while the annular gap 10 is functioning as an oil lock chamber. Hence, according to the present embodiment, because the pressure in the annular gap 10, which is a high pressure when the shock absorber D is fully extended, is not transmitted to the oil seal 21, a load does not act on the oil seal 21 and the durability of the oil seal 21 improves.

In addition, as mentioned earlier, when an oil lock chamber is to be formed on the inside of the subcylinder 5, because it is hard to secure the pressure-receiving area at the time of oil lock, there may be a lack of shock absorption when the shock absorber D reaches the extension limit.

However, in the shock absorber D according to the present embodiment, because the annular gap 10, which functions as an oil lock chamber, is formed on the outside of the subcylinder 5, in comparison with a case where the oil lock chamber is formed on the inside of the subcylinder 5, the pressure-receiving area at the time of oil lock can be greatly secured, and shock absorption when the shock absorber D reaches the extension limit is improved.

Moreover, when the shock absorber D is used in a vehicle suspension, although a lateral force, which is a force in the direction in which the cylinder 1 is bent, acts on the shock absorber D while the vehicle is turning, because the outer periphery of the subpiston 6 is in sliding contact with the inner periphery of the cylinder 1 according to the present embodiment, this lateral force is received in conjunction with the piston 3.

Figure 3:
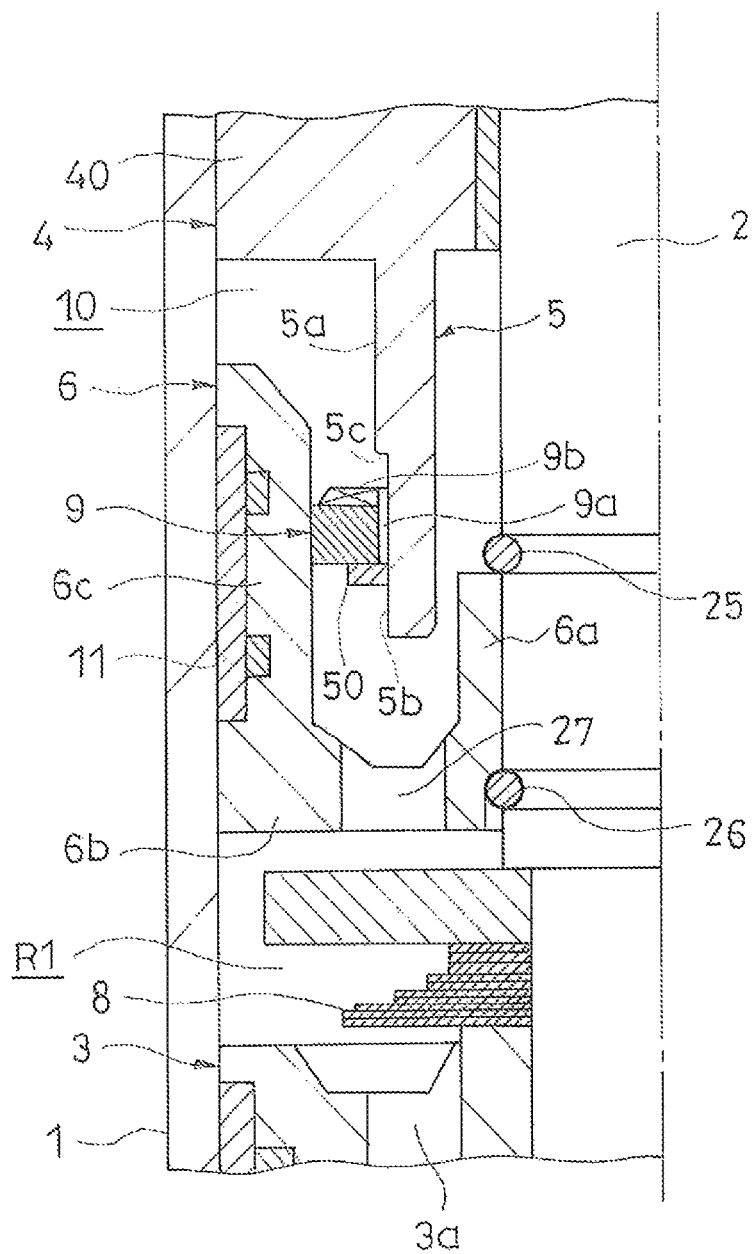
FIG. 3 is a diagram illustrating a modification example of FIG. 2.

Further, although the oil lock piece 9 is mounted on the inner periphery of the tubular portion 6c in the present embodiment, the oil lock piece 9 may also be mounted on the outer periphery of the subcylinder 5, as illustrated in FIG. 3.

More specifically, according to the modification example illustrated in FIG. 3, the step portion 6f is not provided on the tubular portion 6c, and the subcylinder 5 comprises a large outside diameter portion 5a formed on the rod guide body 40 side, a small outside diameter portion 5b that is connected to the large outside diameter portion 5a on the opposite side from the rod guide body and has a smaller outside diameter than the large outside diameter portion 5a, and a step 5c formed at the boundary between the large outside diameter portion 5a and small outside diameter portion 5b.

Further, the oil lock piece 9 is slidably mounted on the inner periphery of the small outside diameter portion 5b. Furthermore, an annular regulating member 50 that prevents detachment of the oil lock piece 9 is fixed to the small outside diameter portion 5b closer to the piston 3 than the oil lock piece 9.

According to this configuration, when the shock absorber D is fully extended, at which point the rod 2 is maximally withdrawn from the cylinder 1, the tubular portion 6c is inserted into the annular gap 10 while making sliding contact with the oil lock piece 9. Thus, fluid in an amount corresponding to the volumetric capacity of penetration of the tubular portion 6c is discharged from the annular gap 10 through the gap between the oil lock piece 9 and tubular portion 6c. Then, in pushing against the flow of the discharged fluid, the oil lock piece 9 moves toward the regulating member 50, abuts against the regulating member 50, and the upward and downward communication of the oil lock piece 9 via the vertical groove 9a and notch 9b is blocked, and hence the annular gap 10 is sealed and the pressure rises. Accordingly, when the shock absorber D is fully extended, the annular gap 10 is oil-locked and the shock when the shock absorber D reaches the extension limit can be absorbed.

Further, when the shock absorber D switches from a fully extended state to a contracting action, the oil lock piece 9 moves toward the step 5c, the annular gap 10 communicates with the chamber on the piston 3 side via the vertical groove 9a and notch 9b, and the fluid in the extension-side chamber R1 flows to the annular gap 10, and therefore the subpiston 6 smoothly exits the annular gap 10.

In addition, when the oil lock piece 9 is mounted on the outer periphery of the subcylinder 5 as illustrated in FIG. 3, in comparison with a case where the oil lock piece 9 is mounted on the inner periphery of the tubular portion 6c of the subpiston 6 as per the example of FIG. 2, attachment of the oil lock piece 9 is straightforward and the assemblability of the shock absorber D improves.

However, when the oil lock piece 9 is mounted on the inner periphery of the tubular portion 6c of the subpiston 6 as illustrated in FIG. 2, pressure can be applied to the fluid in the annular gap 10 by the tubular portion 6c and oil lock piece 9 when the shock absorber D is fully extended. Hence, in comparison with a case where the oil lock piece 9 in FIG. 3 is mounted on the outer periphery of the subcylinder 5, the pressure-receiving area at the time of oil lock can be greatly secured, shock absorption when the shock absorber D reaches the extension limit is improved, and in the shock absorber D according to the present embodiment, the piston 3 and subpiston 6 can each be held, spaced apart from each other, by the rod 2. According to this configuration, because the annular gap 10 rises in pressure when the shock absorber D is fully extended and the shock acting on the subpiston 6 is not directly transmitted to the piston 3, the piston 3 and peripheral components such as the compression-side valve 8 laminated on the extension-side chamber R1 side of the piston 3 are not adversely affected.

Note that, although, according to the present embodiment, the oil lock piece 9 is mounted on the inner periphery of the tubular portion 6c or the outer periphery of the subcylinder 5, the oil lock piece 9 could also be omitted such that the inner periphery of the tubular portion 6c of the subpiston 6 is brought into direct sliding contact with the outer periphery of the subcylinder 5, for example.

Although preferred embodiments of the present invention have been described in detail hereinabove, it goes without saying that alterations, modifications and changes can be made without departing from the scope of the claims.

The invention claimed is:

1. A shock absorber, comprising:
a cylinder;
a rod that is retractably inserted in an axial direction inside the cylinder;
a piston that is provided at a tip of the rod and partitions the inside of the cylinder into an extension-side chamber and a compression-side chamber;
a rod guide that is provided at an open end of the cylinder and axially supports the rod;
a subcylinder that is provided on the rod guide and forms an annular gap between the subcylinder and the cylinder; and
a subpiston that is provided on an outer periphery of the rod closer to a base end thereof than the piston, that has an outer periphery in sliding contact with an inner periphery of the cylinder, and that is capable of leaving and entering the annular gap,
wherein the subpiston has a tubular portion which is inserted into the annular gap when the rod has maximally withdrawn from the cylinder, and an annular oil lock piece which is mounted on an inner periphery of the tubular portion.

2. The shock absorber as claimed in claim 1,
wherein the piston and the subpiston are each held, spaced apart from each other, by the rod.

3. A shock absorber, comprising:
a cylinder;
a rod that is retractably inserted in an axial direction inside the cylinder;
a piston that is provided at a tip of the rod and partitions the inside of the cylinder into an extension-side chamber and a compression-side chamber;
a rod guide that is provided at an open end of the cylinder and axially supports the rod;
a subcylinder that is provided on the rod guide and forms an annular gap between the subcylinder and the cylinder; and
a subpiston that is provided on an outer periphery of the rod closer to a base end thereof than the piston, that has an outer periphery in sliding contact with an inner periphery of the cylinder, and that is capable of leaving and entering the annular gap,
wherein the piston and the subpiston are separate parts, and are held by the rod with a gap in the axial direction from each other.

4. The shock absorber as claimed in claim 3,
wherein the subpiston has a tubular portion which is inserted into the annular gap when the rod has maximally withdrawn from the cylinder, and
wherein an annular oil lock piece is mounted on an outer periphery of the subcylinder.

* * * * *